United States Patent Office 3,196,186
Patented July 20, 1965

3,196,186
NITRATION OF TOLUENE IN THE PRESENCE
OF AN AROMATIC SULFONIC ACID
Allen W. Sogn, Williamsville, N.Y., and Joseph G. Natoli,
Parlin, N.J., assignors to Allied Chemical Corporation,
New York, N.Y., a corporation of New York
No Drawing. Filed Feb. 18, 1964, Ser. No. 345,592
11 Claims. (Cl. 260—645)

This invention relates to the nitration of toluene. More particularly it relates to a novel process for the nitration of toluene whereby a larger proportion of p-nitrotoluene is obtained than has been possible heretofore, and at the same time a very high total yield of nitrotoluenes is realized.

The conventional procedure for the large scale preparation of mononitro toluenes involves the reaction of toluene and mixed acid (a mixture of nitric acid, sulfuric acid and water). The resultant product is a mixture of the three isomeric mononitro toluenes, the ratio being fairly constant irrespective of the reaction conditions, about 60% ortho nitrotoluene, about 35% of the para isomer and about 5% of the meta isomer. Since the para isomer is usually in greatest demand this procedure has resulted in an over-production of ortho nitrotoluene. It has recently been suggested, in order to overcome this disadvantage, that toluene nitration be carried in the presence of a nuclearly sulfonated aromatic ion exchange resin, whereby the proportion of para isomer is increased. This procedure, however, while increasing the proportion of para isomer formed, is relatively inefficient with respect to the yield based on nitric acid charged, thereby rendering the process impractical on a commercial scale.

It is therefore an object of the present invention to provide a novel process for the nitration of toluene.

It is another object to provide a novel process for nitrating toluene whereby the proportion of p-nitrotoluene produced is increased.

It is still a further object to provide a practical process for the preparation of p-nitrotoluene that is efficient and economical.

Other objects will become apparent from the following description of the invention.

The surprising discovery has now been made that monomeric aromatic sulfonic acids, when present in a toluene nitration reaction mixture, alter the isomeric ratio of mononitro toluenes formed. Further, it has now been found under these conditions that p-nitrotoluene is formed in greater proportion than when nitration is carried out in the absence of such aromatic sulfonic acids. The novel process, according to the invention, comprises the essential step of nitrating toluene in the presence of at least one monomeric aromatic sulfonic acid.

The process of the invention results not only in the formation of nitrotoluene mixtures wherein the ratio of para to ortho isomers is increased, but also in a high yield of nitrotoluenes of 90% or more, based on the amount of nitric acid charged.

Monomeric aromatic sulfonic acids comprise a large and well known class of organic chemical compounds. Preferably those members of the class not nitrated or oxidized under the reaction conditions are used, and especially those sulfonic acids which are liquid at ambient, or slightly above, temperatures. Benzene disulfonic acid (a mixture principally of 1,3- and 1,4-benzene disulfonic acids) and toluene disulfonic acid (a mixture of 2,4- and 2,6-tolylene disulfonic acids) are examples of such preferred compounds.

As illustrative of other monomeric aromatic sulfonic acids the following may be mentioned:

Benzenemonosulfonic acid
p-Nitrotoluenesulfo acid
Naphthalene-1,5-disulfonic acid
Naphthalene-2,7-disulfonic acid
Benzene-1,3,5-trisulfonic acid
Ethylbenzene-2,4,6-trisulfonic acid
Naphthalene-1,3,6-trisulfonic acid
Naphthalene-2,4,5,7-tetrasulfonic acid Mixtures of these and equivalent sulfonic acids are contemplated also within the scope of this invention.

Benzene disulfonic acid is, as indicated above, especially preferred according to one embodiment of this invention. This acid is not only highly effective for purposes of the instant process, but also can be readily and substantially completely recovered unchanged from the reaction mixture in liquid form. The acid thereafter can be dehydrated by azeotropic distillation with toluene and the dried toluene-benzene disulfonic acid mixture recycled to the process by merely adding nitrating agent.

The monomeric aromatic sulfonic acids are effective in this process over a wide range of concentrations. The presence of even extremely small amounts, e.g. 0.05 equivalent per mole of toluene nitrated, is sufficient to produce a noticeable increase in the proportion of para isomer produced. The preferred concentration is within the range of about 1 to 2 equivalents per mole of toluene nitrated. The effect of this component, i.e., the effect on total yield of nitrotoluenes and proportion of para isomer produced, appears to reach a maximum when about 2 to 3 equivalents of sulfonic acid are employed and additional amounts produce little or no improvement in either yield of nitrotoluenes or para isomer proportion.

The nitration reaction can be effected using any of the conventional agents known to the art, e.g., concentrated nitric acid, mixed acid, nitrogen tetroxide, nitric acid in acetic acid, and the like. Preferably, according to the method of this invention concentrated, specifically 90%, nitric acid is used, and an excess of toluene is present to act as solvent for the nitrotoluenes produced, in an amount equal to about 2 moles of toluene for each mole of 90% nitric acid. Larger or smaller relative quantities of these two reactants may, of course, be used. However, larger proportional amounts of toluene are not suggested since this increases the amount of toluene which must be recovered by distillation and hence not only reduces the effective capacity of the equipment but also increases the cost of operating the process.

The temperature at which the process is conducted is not critical and can be varied over a broad range, e.g., from 10° to 100° C. or more. Preferably a temperature between about 25° and 50° C., specifically 30° to 40° C., should be used. At lower temperatures the reaction rate becomes so progressively slow as to be impractical, whereas at temperatures progressively above about 50° C., side reactions, e.g. oxidation, dinitration, etc. become more and more pronounced and hence are not recommended.

In accordance with a preferred mode of carrying out this invention, about 1.5 moles of m-benzenedisulfonic acid suspended in about 4 moles of toluene and the mixture is distilled to remove water as an azeotrope with toluene. The dry mass is cooled to 35° to 40° C. and about 2 moles of 90% nitric acid are slowly added while maintaining the temperature at about 35° to 40° C. The mixture is agitated for about 2–3 hours thereafter and then permitted to separate into layers. The lower layer of benzene disulfonic acid is separated and dried by azeotropic distillation with toluene. The dried mass can be recycled to a succeeding nitration. The upper oil layer, comprising nitrotoluenes and excess toluene is washed with water and aqueous alkali to remove unreacted acid and acidic by-products and then distilled to recover unchanged toluene. The residue, mixed nitrotoluenes, can be separated by any conventional means, e.g., fractional distillation or crystallization into its isomeric components or used per se as a mixture rich in para nitrotoluene.

The invention will be described further in conjunction with the following specific examples, but it is to be understood that these examples are merely illustrative and not intended to limit the invention thereto. Parts and percentages are by weight and temperatures are given in degrees centigrade.

This recycling of recovered sulfonic acid was repeated nine times with the results shown in Table I below. The separation of the nitrotoluene layer and m-benzenedisulfonic acid layer was not complete in all instances. In several cycles the sulfonic acid layer was an emulsion which was broken by addition of a toluene wash. The nitrotoluenes occluded in the sulfonic acid layer were carried over to the next or succeeding cycle wherein they were recovered more or less completely.

*Table I*

| Toluene, pts. | 90% HNO₃, pts. | Reaction Temp., degrees | Toluene Wash | Nitro-Toluene | Recovered Toluene | S.P. of Oil, degrees | Percent para nitrotoluene |
|---|---|---|---|---|---|---|---|
| 368 | 140 | 35-40 | 0 | 216 | 140 | ¹ 9.5 | 43.9 |
| 368 | 140 | 35-40 | 0 | 194 | 130 | 10.0 | 44.2 |
| 368 | 140 | 35-40 | 0 | 334 | 220 | 8.8 | 43.2 |
| 368 | 140 | 35-40 | 0 | 268 | 176 | 8.4 | 42.9 |
| 268 | 140 | 35-40 | 368 | 275 | 475 | 7.2 | 41.9 |
| 368 | 140 | 35-40 | 0 | 220 | 144 | ² 4.2 | 39.5 |
| 368 | 140 | 35-40 | 300 | 240 | 352 | 9.4 | 43.7 |
| 368 | 140 | 35-40 | 200 | 215 | 230 | 8.8 | 43.2 |
| 368 | 140 | 30-35 | 223 | 290 | 384 | 6.8 | 41.7 |
| 368 | 140 | 25-30 | 375 | 290 | 472 | ³ 6.6 | 41.4 |

LEGEND.—Isomers by chromatographic analysis:

| | (1) | (2) | (3) |
|---|---|---|---|
| Meta...........percent.. | 3.55 | 2.65 | 2.87 |
| Ortho...........do.... | 51.21 | 56.99 | 53.76 |
| Para...........do.... | 45.18 | 40.09 | 43.63 |

EXAMPLE 1

A mixture of 300 parts of m-benzenedisulfonic acid (Eastman Technical Grade) and 368 parts of toluene was warmed to 35° to 40°. Over a period of ½ hour, 140 parts of 90% nitric acid were added dropwise to the agitated mixture which was maintained at 35° to 40°. The mass was agitated for an additional 2½ hours at 35° to 40° and then phase separated. The upper oil layer was washed twice with equal volumes of water and then with 2% aqueous sodium carbonate. The oil was then washed alkali free with water. The washed material was distilled in vacuo to recover unreacted toluene. The distilland, 216 parts, had a setting point of 9.5° which is characteristic of a mixture of isomeric mononitro toluenes containing 44% of the para isomer. By vapor phase chromatographic analysis the oily product was shown to contain

| | Percent |
|---|---|
| Para nitrotoluene | 45.18 |
| Ortho nitrotoluene | 51.21 |
| Meta nitrotoluene | 3.55 |

The lower layer obtained above comprised m-benzenedisulfonic acid and water. To it were added 368 parts of toluene and the mixture distilled to remove water azeotropically. The anhydrous mixture can be used for a succeeding nitration.

EXAMPLE 2

The procedure of Example 1 above was repeated and additionally the recovered m-benzenedisulfonic acid-toluene mixture after separation and drying by azeotropic distillation was treated with 140 parts of 90% nitric acid.

The total yield of nitrotoluenes from these ten cycles was 2542 parts which was 92.8% of the theoretical yield of 2740 parts based on the amount of nitric acid charged, 1400 parts. This yield indicates the excellent efficiency of utilization of the nitric acid in this process which gave consistently high proportions of para nitrotoluene.

EXAMPLE 3

The procedure of the above examples was repeated with the variations in detail as indicated in the following Table II.

*Table II*

| m-Benzene disulfonic acid | Toluene | 90% HNO₃ | Reaction Temp., degrees | Time of Addit. HNO₃ | After Period | Toluene Wash | Recovered Toluene | Nitro-Toluene | Percent Yield | S.P. of Oil, degrees | Para-nitrotoluene |
|---|---|---|---|---|---|---|---|---|---|---|---|
| 325 | 368 | 140 | 20-25 | 1 hr | 18 hr | 500 | | 250 | 91.0 | 6.1 | 41 |
| 340 | 368 | 140 | 10-14 | 1 hr | 23 hr 5°-10° | 213 | | 246 | 90.2 | 8.0 | 42.8 |
| 316 | 368 | 140 | 25-30 | 83 min | 20 hr | 0 | 140 | 250 | 91.0 | 9.2 | 43.5 |
| 316 | 650 | 140 | 35-40 | 90 min | 2 hr | 0 | 436 | 255 | 93.0 | 11.4 | 45.6 |
| 316 | 920 | 160 | 35-40 | 92 min | 2 hr | 0 | 640 | 310 | 98.4 | 9.8 | 44 |
| 300 | 920 | 140 | 35-40 | 25 min | 4 hr | 0 | 627 | 263 | 96.3 | 10.2 | 44.5 |

EXAMPLE 4

To a mixture of 215 parts of 2,4-toluenedisulfonic acid and 368 parts of toluene maintained at 20° to 25°, 140 parts of 90% nitric acid were added over a period of about 25 minutes. The nitration mass was agitated for about 18 hours and thereafter permitted to separate into layers. The upper oil layer was washed and distilled as in Example 1 above. The residue from the distillation, 185 parts, had a setting point of 5° which was indicative of a para isomer content of 40.2%.

It is to be understood for purposes of definition that when the term "equivalent(s)" is used in referring to the concentration of aromatic sulfonic acid, by the term is meant the number of moles of sulfonic acid divided by the number of sulfonic acid groups present.

We claim:
1. In a process for the nitration of toluene, the improvement which comprises carrying out the reaction in the presence of an aromatic sulfonic acid in an amount sufficient to produce a para directive effect.
2. In a process for the production of nitrotoluene by the nitric acid nitration of toluene, the improvement which comprises carrying out the nitration in the presence of an aromatic sulfonic acid in an amount sufficient to produce a para directive effect.

3. A process of claim 2 wherein the aromatic sulfonic acid is material selected from the group consisting of benzenedisulfonic acid, toluenedisulfonic acid, benzenemonosulfonic acid, p-nitrotoluenesulfo acid, naphthalene-1,5-disulfonic acid, naphthalene-2,7-disulfonic acid, benzene-1,3,5-trisulfonic acid, ethylbenzene-2,4,6-trisulfonic acid, naphthalene-1,3,6-trisulfonic acid and naphthalene-2,4,5,7-tetrasulfonic acid.

4. A process for the production of nitrotoluene which comprises reacting toluene with concentrated nitric acid at a temperature within the range of from about 10° C. to about 100° C. in the presence of an aromatic sulfonic acid in an amount from about 0.05 equivalent to about 3 equivalents per mole of toluene.

5. A process for the production of nitrotoluene which comprises reacting toluene with concentrated nitric acid in a molar ratio of about

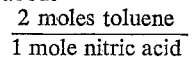

at a temperature within the range of from about 25° C. to about 50° C. in the presence of an aromatic sulfonic acid in an amount from about 0.05 equivalent to about 3 equivalents per mole of toluene.

6. A process of claim 5 wherein the aromatic sulfonic acid is m-benzenedisulfonic acid.

7. A process of claim 5 wherein the aromatic sulfonic acid is 2,4-toluene disulfonic acid.

8. A process for the production of nitrotoluene which comprises reacting toluene with concentrated nitric acid in a molar ratio of about

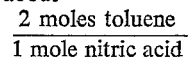

at a temperature within the range of from about 25° C. to about 50° C. in the presence of an aromatic sulfonic acid in an amount from about 0.05 equivalent to about 3 equivalents per mole of toluene, allowing the mixture to separate into two layers, recovering the lower layer comprising aromatic sulfonic acid and water and thereafter adding toluene to said lower layer, azeotropically distilling the resulting mixture and recycling it in the anhydrous form to the reaction.

9. A process for the production of nitrotoluene which comprises adding 90% nitric acid in a molar ratio of about

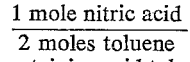

to a reaction zone containing said toluene and an aromatic sulfonic acid or a mixture thereof, the quantity of sulfonic acid added being in an amount from about 1 equivalent to 2 equivalents per mole of toluene and maintaining the temperature within the range or from about 25° C. to about 50° C. throughout the nitration.

10. A process of claim 9 wherein the aromatic sulfonic acid is m-benzenedisulfonic acid.

11. A process of claim 9 wherein the aromatic sulfonic acid is 2,4-toluenedisulfonic acid.

No references cited.

CARL D. QUARFORTH, *Primary Examiner*.